United States Patent Office 3,778,355
Patented Dec. 11, 1973

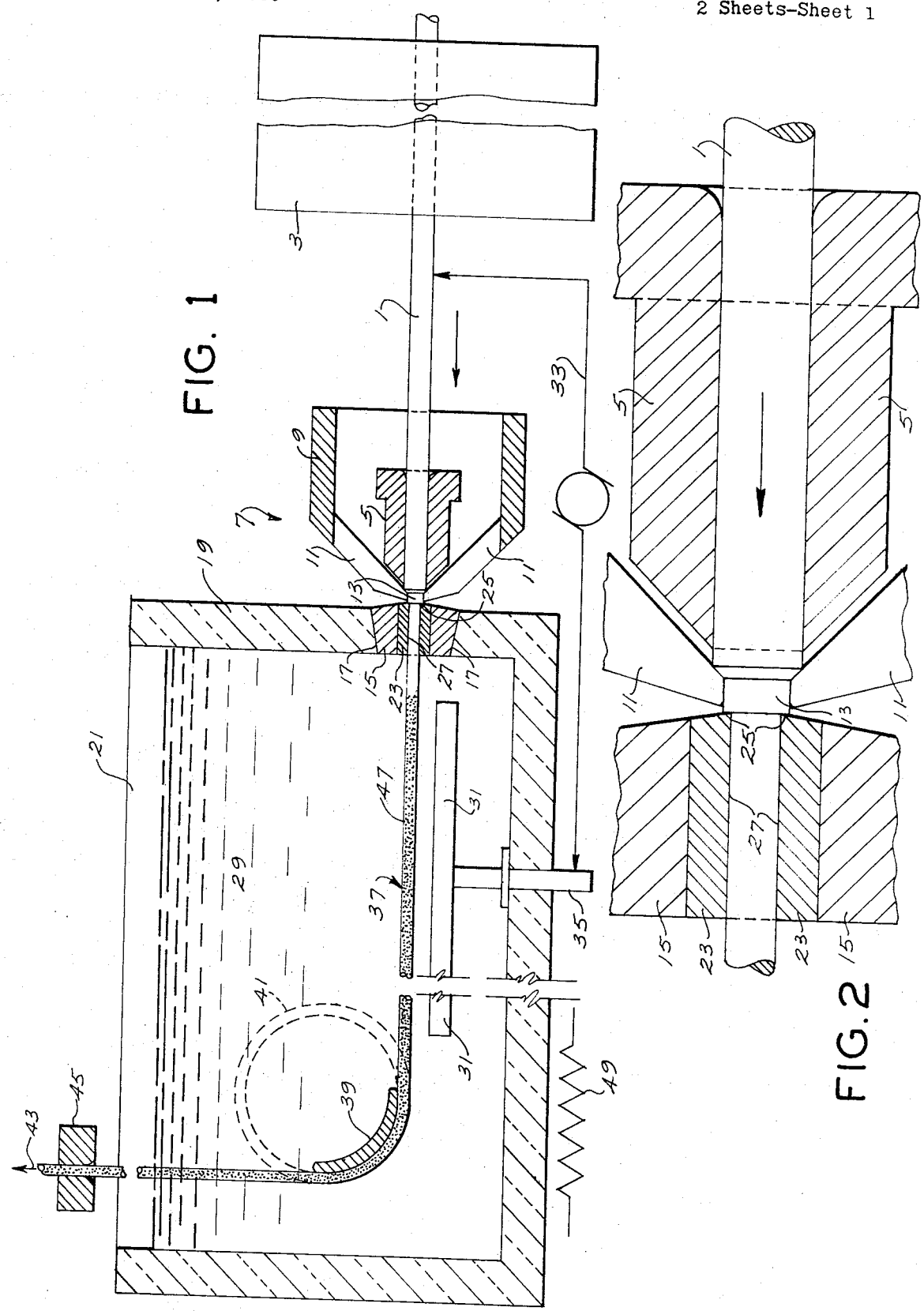
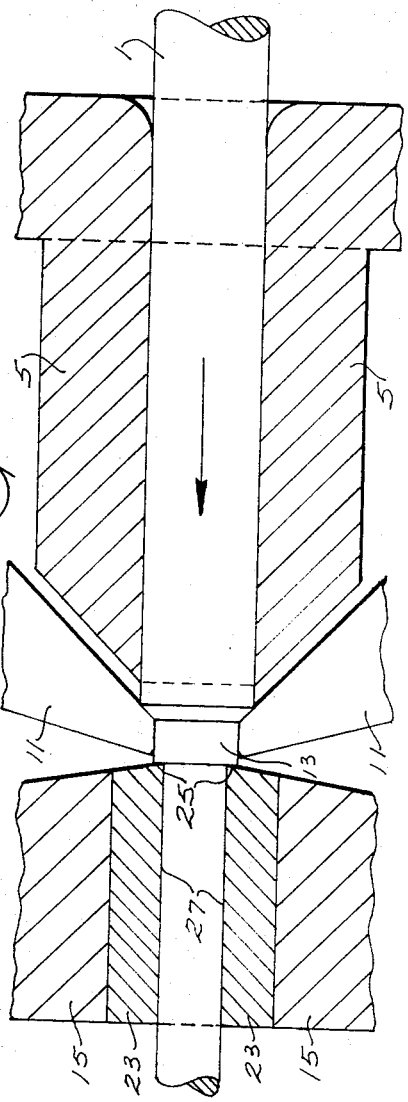

3,778,355
METALLIC COVERING OF CONTINUOUS METALLIC CORE MATERIAL
Keith N. Johnson, Cumberland, R.I., and Paul O. Hagarman, North Attleboro, Mass., assignors to Texas Instruments Incorporated, Dallas, Tex.
Filed Oct. 25, 1968, Ser. No. 770,678
Int. Cl. C23b 5/18, 5/58, 5/60
U.S. Cl. 204—28
2 Claims

ABSTRACT OF THE DISCLOSURE

A core-forming wire, to be covered with metal, is continuously drawn first through a circumferential milling device for skin removal and then through an axially operating shaving and protective die to provide a virgin surface. From the shaving die it moves in uncontaminated condition into a bath for applying a metal cover or sheath to its surface by electroplating, hot-dipping, tinning or the like. The core is in covered condition after leaving the bath and after solidification of the sheathing material is passed through suitable finishing means.

Figure 3:
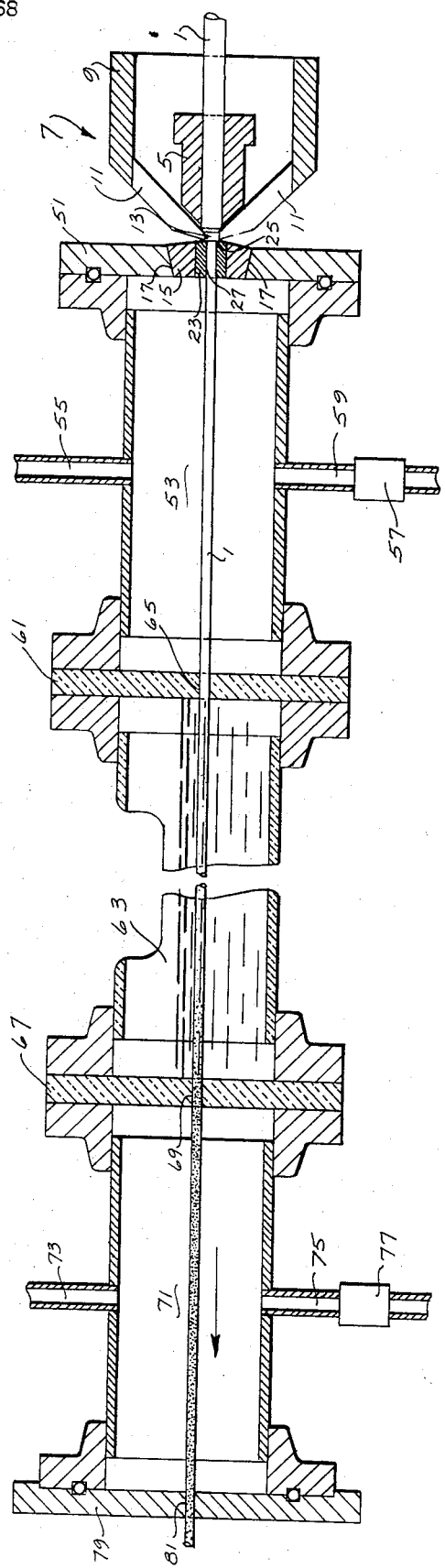

The electroplating, hot-dipping or tinning of continuous lengths of core-forming metal for forming a different metallic coating or sheath thereon requires that the core surfaces be very clean. This is particularly true in the case of aluminum wire required to be electroplated with copper, for aluminum is extremely prone to rapid reoxidation in air after oxide removal. Such oxide acts as a contaminant interfering with application of a satisfactory metal covering. Thus the invention is particularly useful for improvedly electroplating a copper sheath on an aluminum core wire but it is also useful for other combinations of core and covering metals employing hot-dipping, tinning or the like.

Referring to the drawings,
FIG. 1 is a diagrammatic illustration of one form of the invention;
FIG. 2 is an enlarged view of certain milling and shaving components of FIG. 1; and
FIG. 3 illustrates another form of the invention.

Referring to FIGS. 1 and 2, there is shown at numeral 1 an aluminum wire which according to one example is to be electroplated with copper. The surface as usual is oxidized because of contact with air. The wire 1 is drawn from an appropriate supply of the same (not shown), and if needed through conventional preparing apparatus 3 for drawing it, guiding it, removing gross contaminants or the like. Further details in this regard are not required since they are conventional. In any event the wire will still have an air-formed oxide contaminant on its surface.

After the wire leaves the apparatus 3, it passes through a guide bushing 5 surrounding which is a rotary so-called hollow milling device 7 having a rotary head 9 rotatably driving milling cutters 11. Rotation of the milling device 7 is accomplished by any suitable means (not shown) but details of which, if desired, may be obtained from U.S. patent application Ser. No. 607,254 of Paul A. Dion and Arthur James Thompson, filed Jan. 4, 1967, for Manufacture of Clad Wire and the Like. The guide 5 is lubricated, and the cutters may be lubricated, by conventional application of cutting oil, although the latter may not be necessary.

As illustrated at 13, the outer skin of the wire is removed by the circumferentially operating milling cutters 11, whereby the wire diameter is reduced. As the skinned wire moves from the cutters 11, it enters a shaving die 15 having a conical exterior 17 wedged into a conical opening in one wall 19 of a vessel 21 for liquid containment. The vessel 21 may be made of a material to resist electrolytic attack, or in the alternative as will appear to function as a crucible. Thus for example a ceramic is useful.

In the die 15 is a hard bushing 23 having a circular cutting inlet edge 25 for shaving or skiving the wire which passes through it. The bushing may be made of silicon carbide or other known hard cutting material. The cutting edge 25 skives an additional amount of material from the wire 1 so as to produce a virgin surface thereon as it enters the die. The circular cutting edge 25 also forms an effective seal against access of any oxidizing air to the skived virgin surface of the wire within the die. It is only a few thousandths of an inch from the cutting path of the cutter 11. Thus the cutters also break away chips formed by the cutting edge 25 of die 15. As a result jamming of the cutting action at 25 is prevented. Thus better skiving and sealing action are obtained with better production and protection of a virgin surface for entry into the container 19.

The container 19 for the purpose of electroplating copper on the virgin surface of the entering aluminum is filled with a conventional electrolyte, such as a copper fluoborate, copper sulphate, copper cyanide, copper pyrophosphate bath 29 or the like. Submerged in the electrolyte 29 is an anode 31 which may be either of the insoluble or soluble type. An electromotive circuit 33 is connected across a terminal 35 of the anode and a suitable sliding connection with the wire 1, as indicated by the arrow-heads in the circuit. Under excitation by circuit 33 the part of the wire entering the electrolytic plating bath 29 becomes a cathode, indicated by numeral 37. If the anode 31 is of the soluble type for plating copper, it is composed of copper. In such case the copper fluoborate or other bath that is used to form the electrolyte 29 requires little or no replenishment. On the other hand, if the anode 31 is of the insoluble type first mentioned, the copper plating bath will require renewal with time in order to maintain satisfactory plating efficiency.

In view of the above it will be seen that the wire enters the electrolyte with an uncontaminated virgin surface. The plated aluminum wire is pulled upward from the bath 29 over a suitable guide such as guide shoe 39 or, if desired, over a rotatable submerged sheave, as indicated by the dotted lines 41. A drawing die is employed as indicated at 45 which sizes the wire and improves its surface and also the bond between it and its cover which is indicated by stippling 47. Suitable means are employed for drawing the wires through the process such as diagrammatically indicated by arrow 43. Such means may be constituted by conventional draw rolls (not shown).

A covering such as tin, a lead-tin alloy or the like may also be accomplished without electrodeposition, in which cases the circuit 33 and the electrode 31 are dispensed with and the container 19 is employed as a heated crucible to carry a metallic melt of the appropriate covering metal to be applied to the wire as it passes through the melt. An appropriate electric heater is diagrammatically illustrated at 49. As the wire emerges from the container 19, some of the melt clings and freezes to it to form the desired covering.

Advantages of the invention are that wires can be covered not only more evenly but at high continuous rates because of the adequate cleaning and preparation. Thus, for example, if a 0.0001" thickness of copper plating is required on an aluminum wire, this can be accomplished under feasible electromotive circuit conditions in about six seconds or so in the electrolyte 29. This requires a container such as 19 only about ten feet or so long to effect a production rate of 100' per minute of finished copper-plated aluminum-core wire. The simplicity of the operation is also notable.

FIG. 3 illustrates a modification in which like numerals designate like parts. In this case, the bushing 17 is located in a sealed end wall 51 of an inlet chamber 53 which through an inlet 55 is supplied with a protective or reducing gas such as cracked city gas, nitrogen, helium or the like. The gas in the chamber 53 is maintained above atmospheric pressure by only conventional means. For example, a control valve 57 in an outlet 59 may be used for this purpose.

At numeral 61 is illustrated an end wall of a vessel 63 for containing the liquid through which passes the skived wire 1 to be coated, after entry wtih free passage through an opening 65 in the wall 61. Gas pressure in chamber 53 prevents outward leakage of liquid from vessel 63 through opening 65 which is large enough to permit said free passage. At numeral 67 is shown a second end wall of the vesesl 63, having a similar opening 69 to permit free movement of the coated wire from the vessel 63. The opening is of a size to prevent marring of the coated wire surface emerging from the vessel 63. Attached to the wall 67 is an outlet chamber 71 through which the coated wire 1 passes. This chamber 71 also carries a protective or reducing gas under pressure which also prevents leakage through the opening 69. The gas inlet is shown at 73 and the outlet at 75 having a control valve 77. The outlet chamber 71 has a sealed end wall 79 in which is a central opening 81 for free exit of the coated wire 1. As in the case of vessel 21, the vessel 63 has associated with it circuitry for electroplating or heating means for hot-dipping or tinning, as the case may be. Cleaning, back-tensioning means or the like such as at 3 (FIG. 1) and finishing die such as 45 (FIG. 1) are also used but not shown in FIG. 3. These are not illustrated in FIG. 3, their design and application being obvious from what has been said in this respect about the form of the invention shown in FIGS. 1 and 2.

Advantages of the FIG. 3 form of the invention are that the skiving die 15 is protected from being reached by any fluid from the vessel 63 which may be corrosive to some die liners 23. Also, openings 65, 69 and 81 have clearance around wire 1, thus minimizing scarification of freshly applied coating on the wire. Leakage of liquid from vessel 63 through such clearance will be withstood because of the tendency of some of the gas under pressure in chambers 53 and 71 to flow therefrom into the vessel 63, thus preventing leakage through the clearance. The collinearity of the inlets and outlets (FIG. 3) obviates the need for wire guides in the liquid container 63 for the tensioned wire.

In view of the above, it will be seen that the several objects of the invention are achieved and other advantageous results attained.

As various changes could be made in the above constructions and processes without departing from the scope of the invention, it is intended that all matter contained in the above description or shown in the accompanying drawings shall be interpreted as illustrative and not in a limiting sense.

What is claimed is:

1. The process for making a wire having an aluminum core and having a coating of a second metal formed around said core comprising the steps of axially advancing an aluminum core wire from a supply, cutting metal material from the entire periphery of said core wire as said core wire is advanced from said supply to form a virgin metal surface entirely around said core wire, said metal material being skived from said aluminum core wire circularly around said core wire to form said virgin metal surface and to form a seal around said core wire for excluding air from said virgin metal surface, said metal material including chips thereof formed by said circular skiving also being milled from said aluminum core wire as said core wire is advanced from said supply for facilitating said circular skiving, axially advancing said core wire having said virgin metal surface from said seal into an electrolytic plating bath, and electrolytically plating a coating of said second metal onto said virgin metal surface of said aluminum core wire to form a metal coating around said core wire.

2. The process as set forth in claim 1 wherein said second metal comprises copper.

References Cited

UNITED STATES PATENTS

| | | | |
|---|---|---|---|
| 1,214,271 | 1/1917 | Bugbee | 204—33 |
| 2,061,554 | 11/1936 | Billiter | 204—209 |
| 2,370,973 | 3/1945 | Lang | 204—28 X |
| 2,680,710 | 6/1954 | Kenmore et al. | 204—28 |
| 2,871,171 | 1/1959 | Atkinson | 204—28 X |
| 3,060,053 | 10/1962 | Carreker et al. | 164—86 X |
| 3,567,596 | 3/1971 | Kelly | 204—28 |

FREDERICK C. EDMUNDSON, Primary Examiner

U.S. Cl. X.R.

29—527.4; 117—51, 128, 130 R; 164—81; 204—33, 52 R